(12) United States Patent
Schraer (10) Patent No.: US 9,121,431 B2
(45) Date of Patent: Sep. 1, 2015

(54) CAGE NUT

(75) Inventor: Thorsten Schraer, Gerolsbach (DE)

(73) Assignee: RUIA GLOBAL FASTENERS AG, Neuss (DE)

( * ) Notice: Subject to any disclaimer, the term of this patent is extended or adjusted under 35 U.S.C. 154(b) by 107 days.

(21) Appl. No.: 13/819,177

(22) PCT Filed: Aug. 31, 2011

(86) PCT No.: PCT/DE2011/050028
§ 371 (c)(1),
(2), (4) Date: Feb. 26, 2013

(87) PCT Pub. No.: WO2012/048686
PCT Pub. Date: Apr. 19, 2012

(65) Prior Publication Data
US 2013/0156526 A1    Jun. 20, 2013

(30) Foreign Application Priority Data
Aug. 31, 2010    (DE) .................. 20 2010 012 019 U (51) Int. Cl.
F16B 37/04      (2006.01)
F16B 31/04      (2006.01)
F16B 39/32      (2006.01)

(52) U.S. Cl.
CPC ............. *F16B 37/044* (2013.01); *F16B 31/04* (2013.01); *F16B 37/042* (2013.01); *F16B 39/32* (2013.01)

(58) Field of Classification Search
CPC ..... F16B 37/043; F16B 37/042; F16B 37/044
USPC ......... 411/172, 173, 349, 549, 551, 111, 113, 411/85, 108
See application file for complete search history.

(56) References Cited

U.S. PATENT DOCUMENTS 2,633,174 A *  3/1953  Ougljesa .................. 411/112
2,681,679 A    6/1954  Poupitch
(Continued)

FOREIGN PATENT DOCUMENTS

DE          952044        11/1956
DE          1962687       12/1969
(Continued)

OTHER PUBLICATIONS

Summary of Office Action issued for corresponding Japanese application 2013-525142, dated Feb. 4, 2014 (1 page).
(Continued)

*Primary Examiner* — Flemming Saether
(74) *Attorney, Agent, or Firm* — Hamre, Schumann, Mueller & Larson, P.C.

(57) ABSTRACT

Cage nut for installation in an elongate, preferably rectangular opening which is only accessible from one side, comprising a nut body with a cylindrical internal thread carrier having an internal thread and an abutment part attached thereto, and a cage encompassing the nut body, wherein the abutment part is adapted to the shape of the opening and has a slightly smaller width and a slightly shorter length than the opening, although the length of the abutment part is significantly greater than the width of the opening; the cage is configured resiliently and is adapted to the shape of the opening such that it can be clipped into the opening and the cage supports stop elements which only allow a rotation of the abutment part with respect to the cage in the screwing-in direction of the internal thread from an installation position parallel to the longitudinal direction of the cage into a retaining position approximately perpendicular thereto.

3 Claims, 12 Drawing Sheets

(56) References Cited

U.S. PATENT DOCUMENTS

| | | | |
|---|---|---|---|
| 2,682,906 A * | 7/1954 | Ougljesa | 411/112 |
| 2,748,825 A * | 6/1956 | Launay | 411/112 |
| 3,398,496 A * | 8/1968 | Mischke | 52/463 |
| 3,785,421 A * | 1/1974 | Launay | 411/108 |
| 4,250,732 A * | 2/1981 | Moryl | 72/357 |
| 4,606,688 A | 8/1986 | Moran et al. | |
| 4,923,347 A * | 5/1990 | Moryl et al. | 411/182 |
| 5,067,863 A * | 11/1991 | Kowalski | 411/85 |

FOREIGN PATENT DOCUMENTS

| | | |
|---|---|---|
| DE | 69506193 | 6/1999 |
| DE | 10-2005-032699 | 1/2007 |
| EP | 0681110 | 11/1995 |
| EP | 0698741 | 2/1996 |
| EP | 0703021 | 3/1996 |
| FR | 1033002 | 7/1953 |
| FR | 2544410 | 10/1984 |
| GB | 687618 | 2/1953 |
| GB | 1265583 | 3/1972 |
| JP | 07-041043 | 7/1995 |

OTHER PUBLICATIONS

Search Report for corresponding German application 20-2010-012-019.5, dated Jun. 22, 2011 (5 pages).

International Search Report for international application No. PCT/DE2011/050028, dated Jan. 27. 2012 (2 pages).

* cited by examiner

CAGE NUT

TECHNICAL FIELD

The present invention relates to a cage nut for installation in an elongate, preferably rectangular opening which is only accessible from one side, comprising a nut body with a cylindrical internal thread carrier having an internal thread and an abutment part attached thereto and a cage which encompasses the nut body.

BACKGROUND

For so-called "blind applications", i.e. for applications in which the installation point can only be accessed from one side, such as large metal sheets, special section tubes, bodywork parts or similar sheet metal parts, so-called "blind rivet nuts" have hitherto been used to introduce a nut thread into parts of this type. These blind rivet nuts (also denoted by BRN) are seated using a specific processing tool, in that by squeezing the blind rivet nuts, a so-called "closing head" is produced which fixes the nut. Since the corresponding blind rivet nuts per se and particularly also the closing head which has formed are relatively weak, in the past it has only been possible to use blind rivet nuts to attach light or ancillary components. The "high-strength blind rivet nut" developed by the company Avdel was the first blind rivet nut to also allow structural connections having relatively high pre-tensioning forces, due to the relatively high thread strength of said nut.

Even in the case of these high-strength blind rivet nuts, the problem arose relatively quickly that bolts with a strength of 10.9 or above, which are to be screwed as far as the yield point, generate such high pre-tensioning forces that the closing head starts to sink or starts to deform during the bolt installation. In the worst case, this would result in the closing head shearing off, i.e. the blind rivet nut would be destroyed and would then have to be replaced. In any case, the subsequent sinking/deformation would result in a significantly lower pre-tensioning force, compared to the presets given by the defined torque and angle of rotation bolting procedure. The additional angle of rotation caused a sinking/deformation of the BRN instead of the desired increase in pre-tensioning force. Due to this sinking or deformation, the industry routinely experiences problems in achieving the defined bolting curves even with high-strength blind rivet nuts and thus in monitoring the correct assembly of tie bars on vehicles, for example.

Another possibility known from the prior art of providing sheet metal parts with internal threads is the use of so-called cage nuts. However, to install cage nuts, in the prior art it was necessary for either the rear side of the part to also be accessible or additional auxiliary holes were required to introduce the cage nut from the side, as is necessary for so-called "C-clips" of the prior art. A cage nut of this type, configured as a clip, is disclosed, for example in EP 703 021 B1 which would appear to be the closest prior art in respect of the present invention.

BRIEF SUMMARY

It is therefore the object of the present invention to make it possible to introduce an internal thread into an opening, which is accessible from only one side, in a sheet metal component, without requiring additional auxiliary openings (as is the case for C-clips), and without the pre-tensioning force restrictions of the prior art blind rivet nuts.

The object of the present invention is achieved by a cage nut which is capable of being installed in an elongate opening which is only accessible from one side, in that this cage nut has an abutment part which is adapted to the shape of the opening and has a slightly smaller width and a shorter length than the opening, although the length of the abutment part is significantly greater than the width of the opening, the cage being of a resilient configuration and being adapted to the shape of the opening such that it can be clipped into the opening, and the cage supports stop elements which only allow a rotation of the abutment part with respect to the cage in the screwing-in direction of the internal thread from an installation position parallel to the longitudinal direction of the cage into a retaining position approximately perpendicular thereto.

In this respect, the stop elements are preferably configured such that they hold the nut body in a floating manner in the cage in the installation position. This measure ensures that the nut body is retained securely in the installation position even during transportation and during processing and also during the clipping-in procedure.

It is also preferred to provide the internal thread with a thread securing means (clamping means) in the region remote from the screwing-in side. This ensures that the nut body is rotated in any case in good time out of the installation position into the retaining position before the end of the screwing-in procedure, since the clamping means forces an adequate transfer of torque between the bolt and the nut body which causes the rotation of the nut body by 90°.

It is further preferred that the cage is configured such that it exerts a spring force on the nut body towards the opening. In this way, the nut body is held even more securely in the installation position, thereby ruling out an accidental premature rotation during transportation or during the clipping in procedure.

A particularly preferred configuration is provided when an annular abutment surface for spring elements of the cage is arranged on the nut body, and when this abutment surface is provided with cams or with an undulating profile such that the cams or the elevated portions of the undulating profile engage with the spring elements of the cage precisely when the nut body leaves its floating installation position in the cage. This can ensure that the nut body locks securely into the retaining position from the installation position.

A further particularly preferred construction is provided when the stop elements rest on an annular abutment which is arranged in the nut body coaxially to the internal thread on the side facing the opening, and when this abutment has recesses for receiving the stop elements, which recesses are arranged such that, in the retaining position, the stop elements are accommodated therein. This measure prevents the nut body from being able to be rotated again into a new installation position beyond the retaining position during installation.

In this respect, it is particularly preferred when the transition from the abutment into the recesses in the direction of rotation is configured as a bevel. This measure ensures a smooth transition into the retaining position and allows different sheet thicknesses to be compensated.

It is further preferred that the transition from the recesses into the abutment is configured as a stop surface which extends parallel to the axis of rotation of the internal thread. This measure can reliably rule out an "over rotation" of the nut body again into an installation position.

A further embodiment of the present invention which is particularly simple to produce is provided when positioned on the blind side of the cage, onto the cylindrical internal thread carrier, is a plastics material part which has a central opening and also has resilient arms which extend beyond a blind-side surface of the cage level with the abutment part and hold said abutment part in a floating manner in the installation position.

In this respect, it is particularly preferred when the plastics material part is provided with a collar which extends in the direction of the blind side and concentrically encloses the cylindrical internal thread carrier.

Finally, it is particularly preferred when the dimensions of the blind-side surface of the cage and of the plastics material part are similar to those of the abutment part and when the arms are respectively arranged diagonally in the vicinity of the corners of the plastics material part in the screwing-in direction of the internal thread, while the stop elements are in each case arranged opposite the arms.

In the following, the present invention will be described in more detail on the basis of the embodiments illustrated in the drawings.

DETAILED DESCRIPTION OF THE INVENTION

Figure 1:
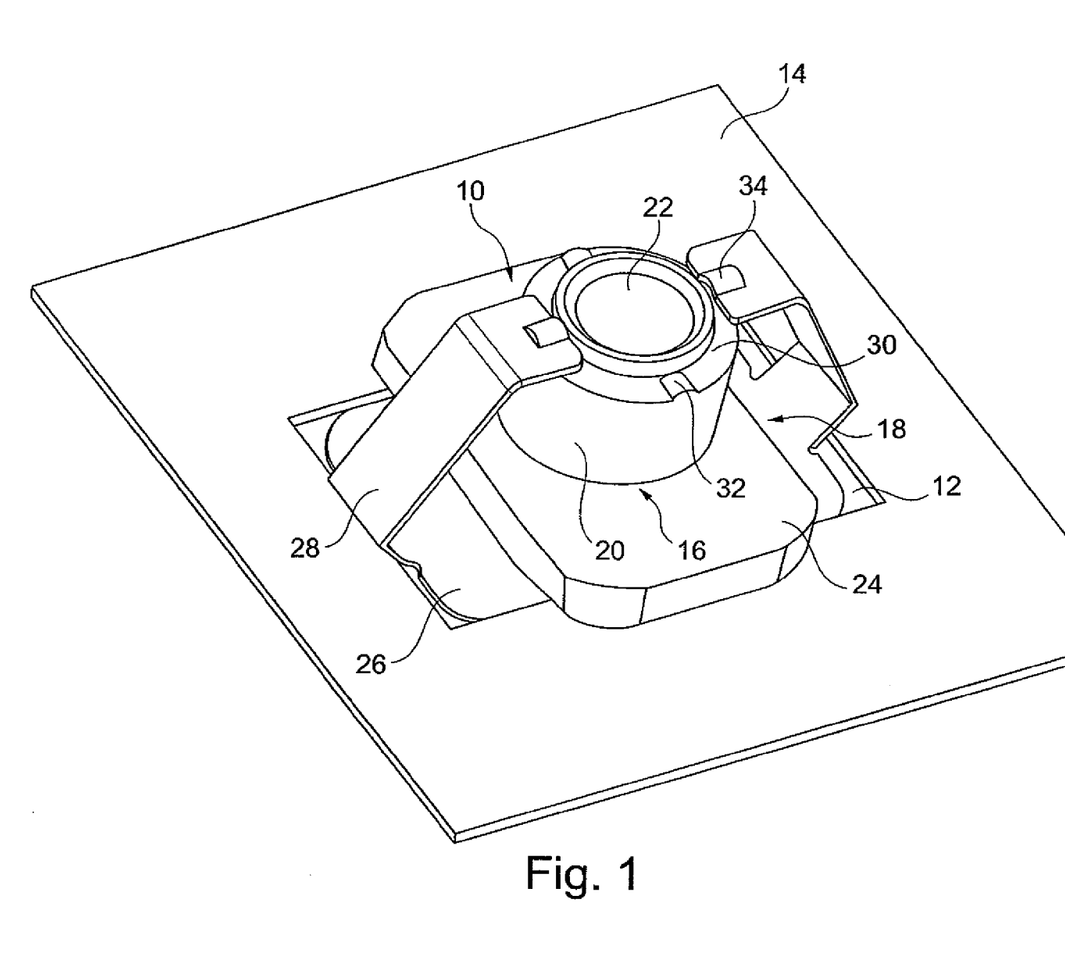
FIG. 1 shows a cage nut according to the invention introduced into an opening in a metal sheet and already being in the retaining position.

FIG. 1 shows a cage nut 10 according to the invention which, in this case, has already been inserted into an opening 12 in a metal sheet 14, and is already in the retaining position. For reasons of clarity, the corresponding bolt which is screwed into the nut is not shown.

The illustrated cage nut 10 according to the invention comprises a nut body 16 which is surrounded by a cage 18. The nut body 16 comprises a cylindrical internal thread carrier 20 with an internal thread 22 and an abutment part 24 which is in the form of an elongate rectangle beveled at the corners and which develops out of the sheet-side end of the internal thread carrier 20. The cage 18 consists of a thin sheet of spring steel and has an elongate rectangular base plate 26, the shape of the base plate 26 approximately corresponding to the shape of the abutment part 24 and the dimensions of the opening 12 being selected to be slightly greater than the dimensions of the abutment part 24 or of the base plate 26.

Two bent-up resilient arms 28 adjoin in each case in the centre of the two short sides of the base plate 26. In this respect, the arms 28 are initially bent obliquely outwards away from the sheet 14 and are then bent slightly obliquely inwards away from the sheet 14. The arms 28 partly engage over the internal thread carrier 20 level with the end, remote from the sheet 14, of the internal thread carrier 20.

At its end remote from the sheet 14, the internal thread carrier 20 has an annular abutment surface 30 which is respectively provided, in the areas in which it comes closest to a side of the abutment part 24, with cams 32 which arch upwards. In this respect, the arms 28 of the cage 18 are provided with corresponding bulges 34 so that they can lock with the cams 32. The cams 32 are thus arranged in a spacing of 90° in each case. Therefore, two opposite cams 32 are covered in each case by the arms 28 both in the installation position and in the retaining position.

Figure 2:
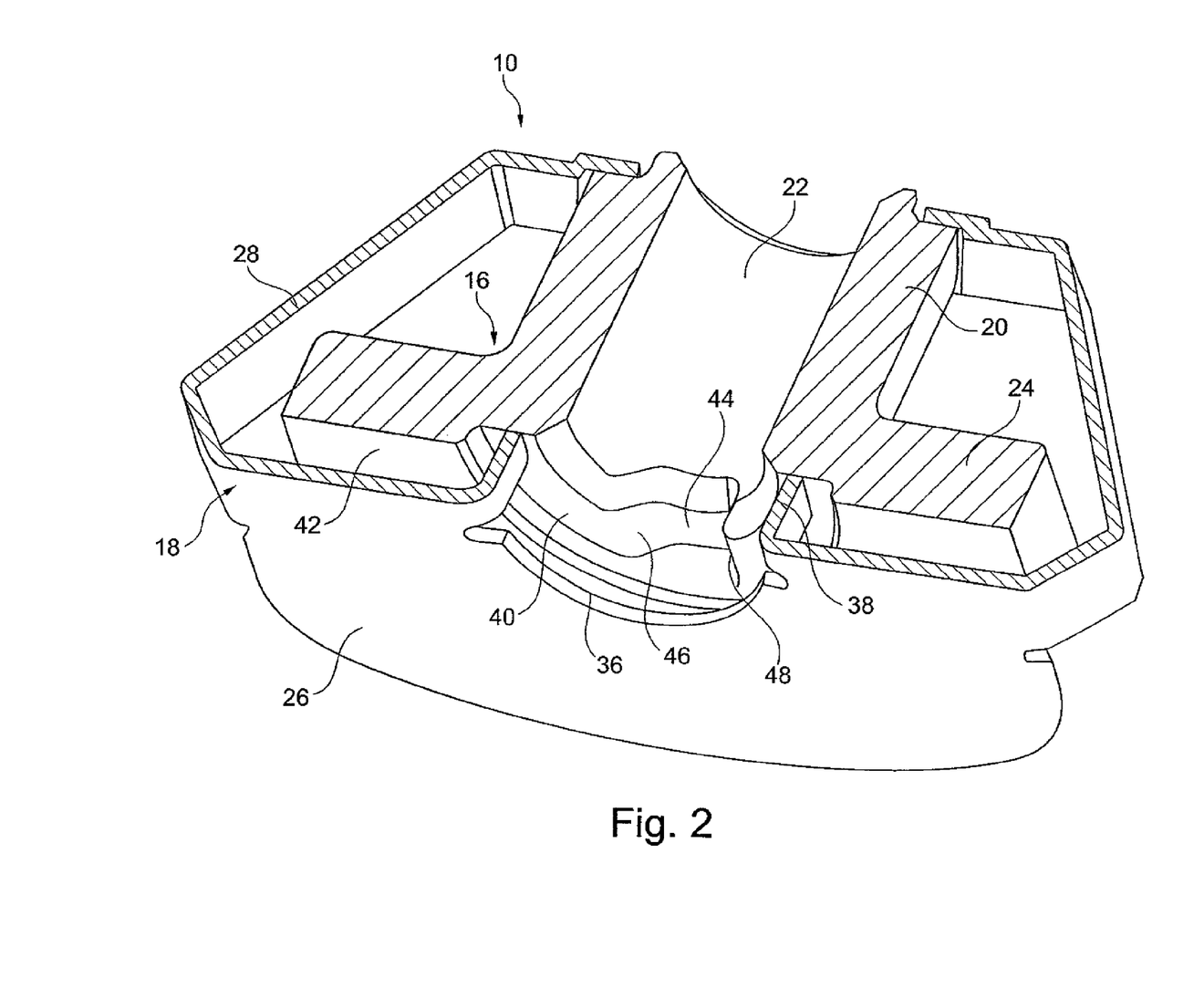
FIG. 2 is a sectional view of the cage nut, according to the invention, of FIG. 1, in the installation position cut parallel to the axis of rotation of the internal thread.

FIG. 2 is a sectional view of the cage nut 10, according to the invention, of FIG. 1 in the installation position and along the axis of rotation of the internal thread 22, viewed from the side of the sheet. This figure clearly shows the opening 36 for the passage of a fitting bolt, which opening is arranged in the base plate 26 of the cage 18. Formed opposite the points of origin of the arms 28, on the edge of the opening 36 are stop elements 38 which are bent vertically upwards away from the sheet side, starting from the base plate 26 of the cage 18. In the installation position shown here, i.e. if the longitudinal directions of the base plate 26 of the cage 18 and of the abutment element 24 of the nut body 16 correspond, the stop elements 38 run on an annular guide path 40 which extends coaxially around the internal thread 22 at the sheet-side end of the internal thread 22. Relative to the sheet-side surface 42 of the abutment part 24, this guide path is arranged offset away from the plane of the sheet 14. The guide path 40 is provided with two recesses 44 which receive the stop elements 38 when the cage nut 10 is in the retaining position. Here, only one recess 44 is shown because of the sectional illustration. The further recess which is not shown is formed point-symmetrically to the axis of rotation of the internal thread 22.

The transition from the guide path 40 into the recess 44 is configured as a bevel 46, thereby allowing a sliding transition from the installation position into the retaining position of the nut 10. The transition from the recess 44 back into the guide path 40 is configured as a stop surface 48 which runs parallel to the axis of rotation of the internal thread 22. This reliably prevents an "over rotation" of the nut body 16 out of the retaining position back into the installation position. Furthermore, the stop surface 48 can be configured such that it interrupts the entire guide path and extends as far as the sheet-side surface 42 of the abutment part 24. This measure can prevent the cage nut 10 according to the invention from being turned against the screwing-in direction into the retaining position from the installation position during transportation or installation before it has even been installed.

Figure 3:
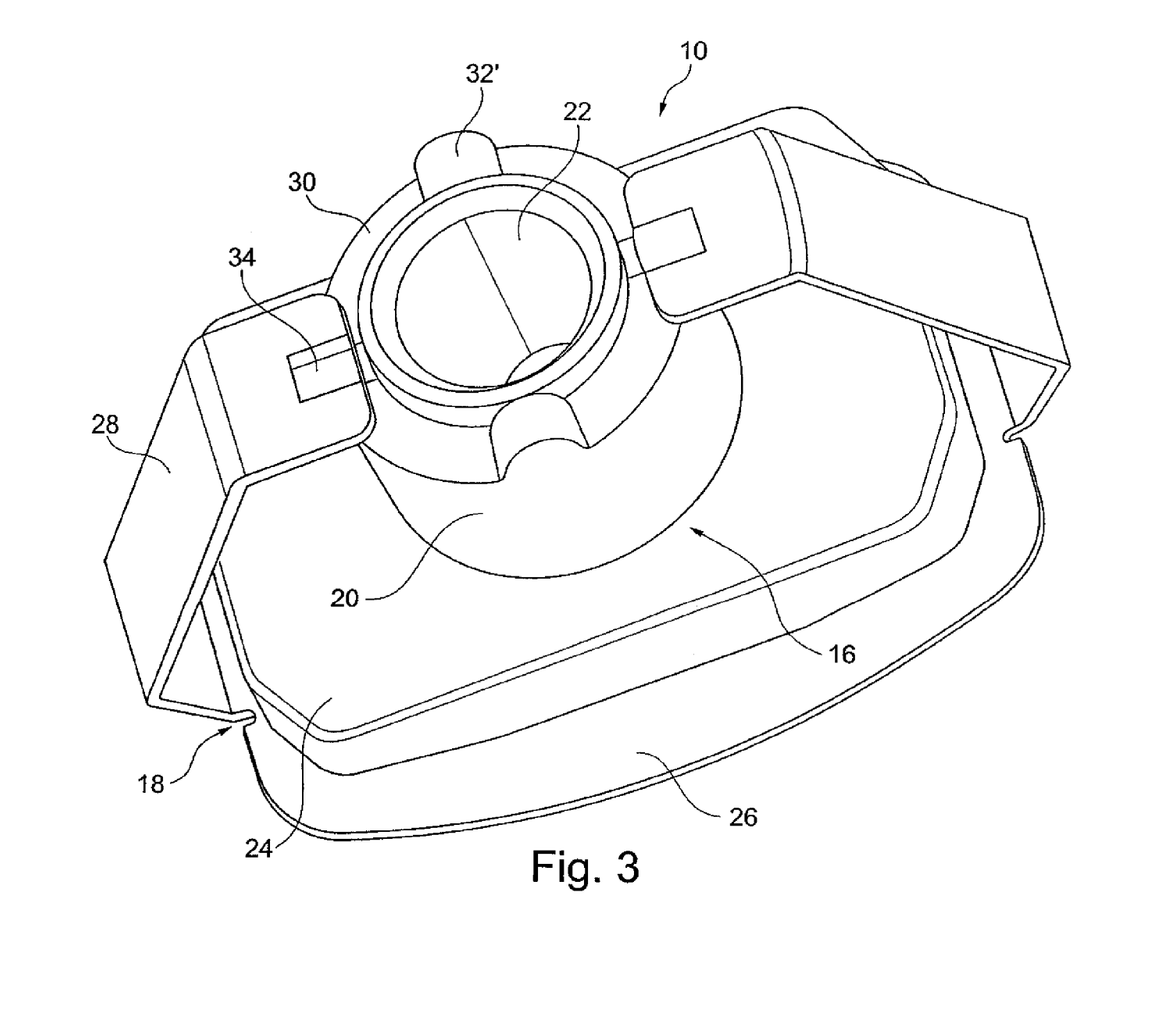
FIG. 3 shows the cage nut, according to the invention, of FIG. 1 in the installation position.

FIG. 3 shows the cage nut 10 according to the invention, again from the viewing direction of FIG. 1, but in the installation position. Therefore, a comparison of FIGS. 1 and 3 allows a detailed description of the installation and bolting procedures.

The cage nut 10 is delivered in the installed state shown in FIG. 3. In this state, the longitudinal sides of abutment part 24 and of base plate 26 of the cage 18 are arranged parallel to one another. As a result, the nut body is held in a floating manner above the base plate 26 by the stop elements 38. The small cams 32 shown in FIG. 1 on the annular abutment surface 30 are located under the corresponding recesses 34 in the resilient arms 28. As a result, the nut body 16 is held to some extent in an anti-rotation manner in this position, so that accidental turning of the nut body 16 relative to the cage 18 during transportation or installation is substantially avoided.

FIG. 2 clearly shows how, in this position, the nut body 16 is held in a floating manner against the spring force of the resilient arms 28 of the cage 18 by the stop elements 38 which are supported on the guide path 40, i.e. there is a defined distance between the base plate 26 of the cage 18 and the sheet-side surface 42 of the abutment part 24 of the nut body 16.

In this state, the cage nut 10 according to the invention is clipped into a suitable opening 12, for example in a metal sheet 14. The spring force of the cage 18 holds the cage nut 10 in the opening 12.

A bolt can then be screwed into the internal thread 22. To ensure a reliable change-over from the installation position into the retaining position of the nut, the internal thread 22 is provided with a thread securing means (clamping means) in the region remote from the screwing-in side.

To ensure that the nut body 16 is also secured in the retaining position, the enlarged retaining cams 32' which can be clearly seen in FIG. 3 are also provided. These retaining cams 32' are configured such that they also ensure adequate spring pre-tension by the resilient arms 28 of the cage 18 on the nut body 16 when the nut body has been moved towards the sheet 14 after the stop elements 38 have sunk into the recesses 44. These enlarged cams 32' also ensure that the nut body 16 cannot be rotated again beyond the retaining position into a new installation position, because the tracking of the spring pre-tension ensures that the stop elements 38 rest securely against the stop surface 48.

Figure 4:
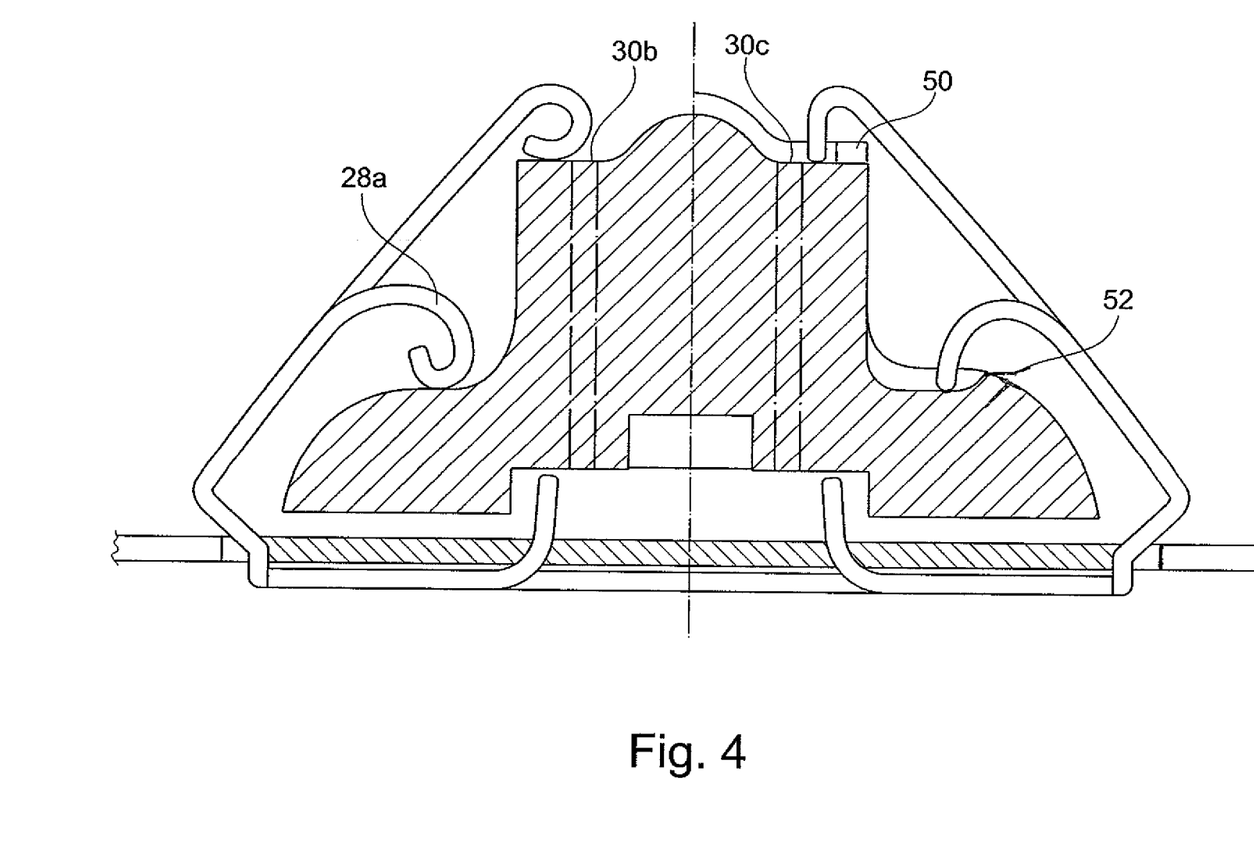
FIG. 4 shows different modified embodiments of the cage nut according to the invention.

FIG. 4 shows further possibilities of configurations according to the invention of the resilient arms 28 of the cage 18. As already shown in FIG. 1-3, these arms 28 can either engage on the end, remote from the sheet 14, of the internal thread carrier 20, in which case the respective engagement surfaces 30*b*, 30*c* can either be smooth or can be configured with an undercut 50 to secure the resilient arms 28.

An alternative construction provides the support of the spring arms 28 on the retaining part 24 of the nut body 16. In this case as well, an undercut 52 can be provided to secure the resilient arms 28 more effectively.

The following FIGS. 5 to 16 show an embodiment of a cage nut according to the invention in detailed workshop drawings.

In this respect, identical reference numerals relate to identical elements, as stated above.

Figure 5:
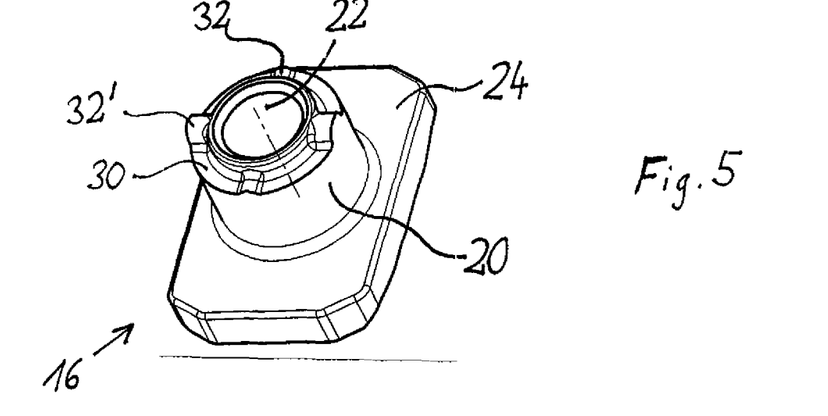
FIG. 5 is a three-dimensional view of an embodiment of a cage nut according to the invention.

FIG. 5 is a three-dimensional spatial view of the corresponding nut body 16, and here the crosswise arrangement of the cams 32 and 32' and the different sizes thereof can be seen very clearly.

Figure 6:
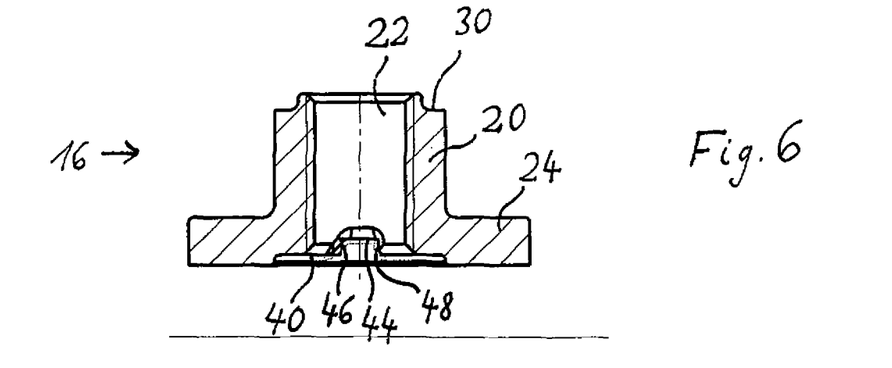
FIG. 6 is a sectional view through the axis of rotation of the internal thread and parallel to the long edges of the nut body of FIG. 5.

FIG. 6 is a sectional view of the nut body of FIG. 5, cut parallel to the long side of the nut body 16 through the axis of rotation of the internal thread 22.

Here, the recess 44 for locking the stop elements 38 in the retaining position can be seen particularly clearly.

Figure 7:
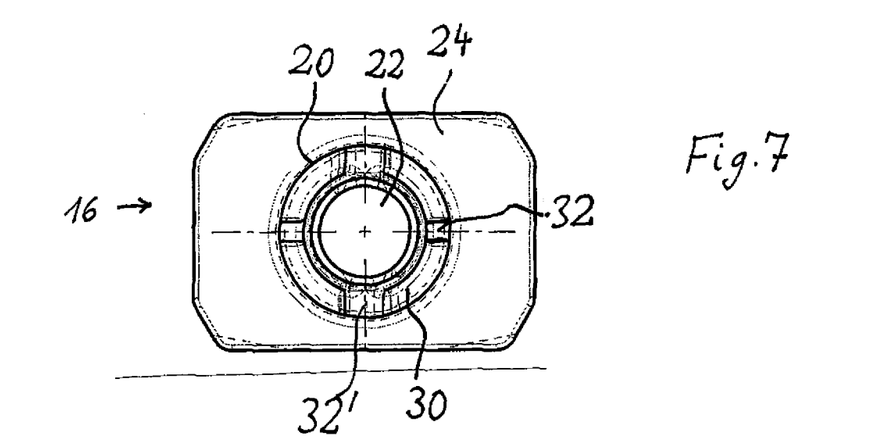
FIG. 7 shows the embodiment of FIG. 5 from above.

FIG. 7 shows the nut body 16 of FIG. 5 from above. This figure also very clearly shows the crosswise arrangement and the different sizes of the cams 32 and 32'.

Figure 8:
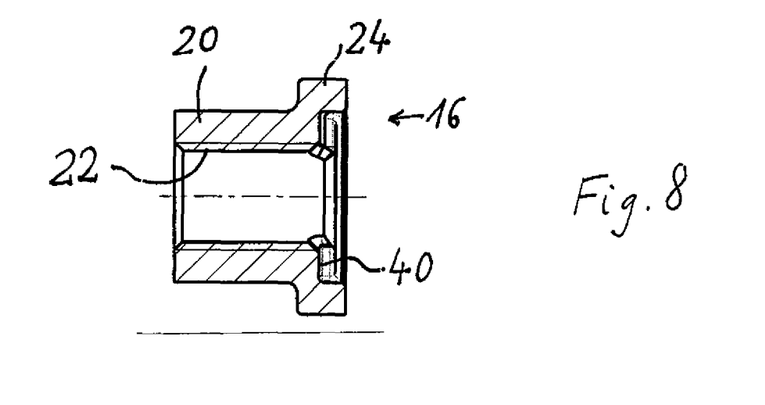
FIG. 8 is a sectional view of the embodiment of FIG. 5, cut through the axis of rotation of the internal thread and parallel to the short edges of the nut body.

FIG. 8 is a sectional view of the nut body 16 of FIG. 5, cut parallel to the short side of the nut body 16 through the axis of rotation of the internal thread 22.

Figure 9:
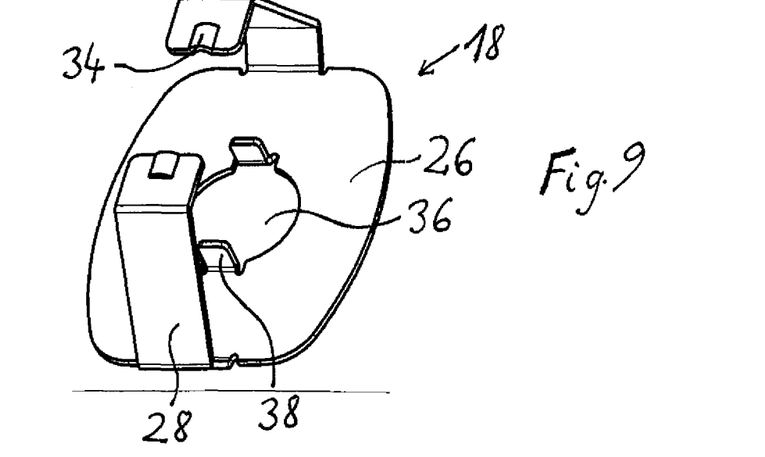
FIG. 9 is a three-dimensional view of the cage belonging to the nut body shown in FIG. 5.

FIG. 9 is a three-dimensional view of a cage 18 which matches the embodiment of the nut body according to FIG. 5. This figure particularly clearly shows the configuration of the resilient arms 28 with the recesses 34 for locking the retaining cams 32, 32' and the formation of the stop elements 38.

Figure 10:
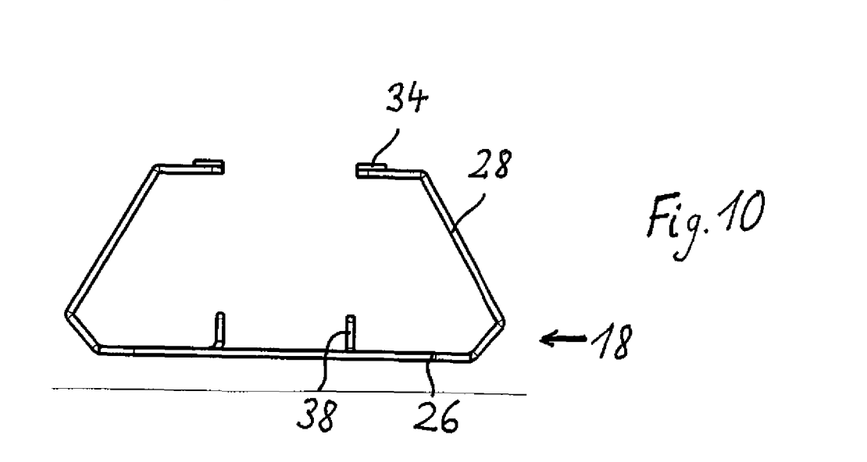
FIG. 10 is a sectional view through the cage of FIG. 9, viewed from the long side.

FIG. 10 shows the cage of FIG. 9, viewed from the long side.

Figure 11:
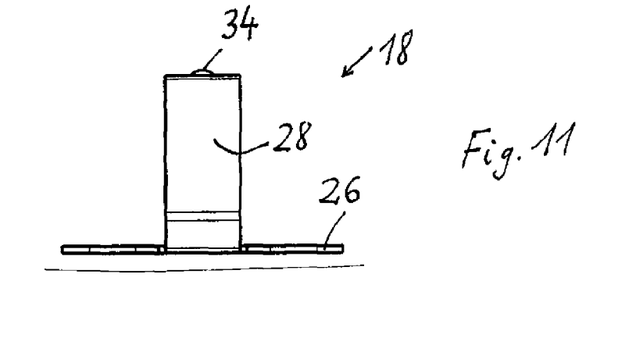
FIG. 11 shows the cage of FIG. 9, viewed from the short side.

FIG. 11 shows the cage 18 of FIG. 5, viewed from the short side.

Figure 12:
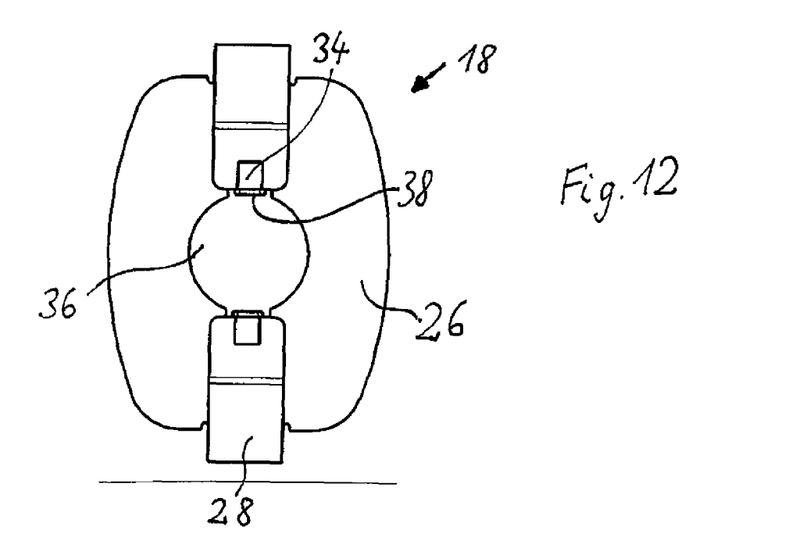
FIG. 12 shows the cage of FIG. 9 from above.

FIG. 12 shows the cage 18 of FIG. 9 from above.

Figure 13:
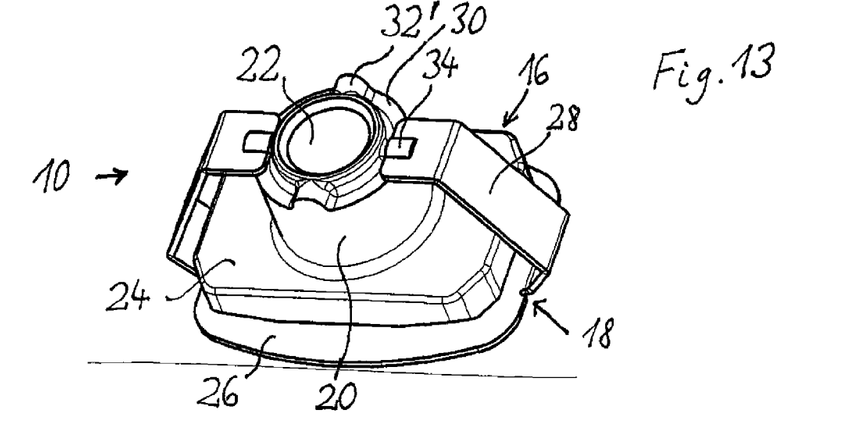
FIG. 13 is a three-dimensional view obliquely from above in the installation position of the cage nut assembled from the parts according to FIGS. 9 and 5.

FIG. 13 is a three-dimensional view, obliquely from above and in the installation position, of the assembly of the nut body 16 with the cage 18 to produce the cage nut 10 according to the invention, i.e. in the form in which the cage nut 10 according to the invention is delivered and is inserted into a corresponding recess in a metal sheet.

Figure 14:
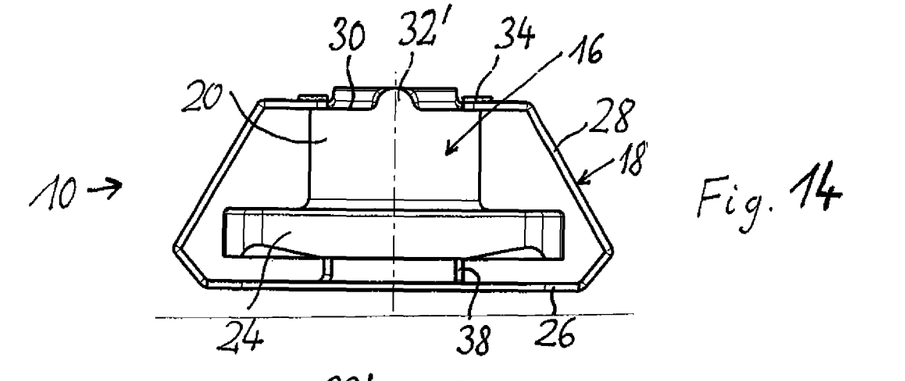
FIG. 14 shows the assembled cage nut of FIG. 13, viewed from the long side.

FIG. 14 shows the cage nut 10 according to the invention, assembled and in the installation position, viewed from the long side, and this figure shows particularly clearly how the nut body 16 is held in a "floating" manner between the stop elements 38 and the relatively small cams 32 which are locked into the recesses 34 in the resilient arms 28. The substantially larger configuration of the enlarged cam 32' can also be seen here very clearly.

Figure 15:
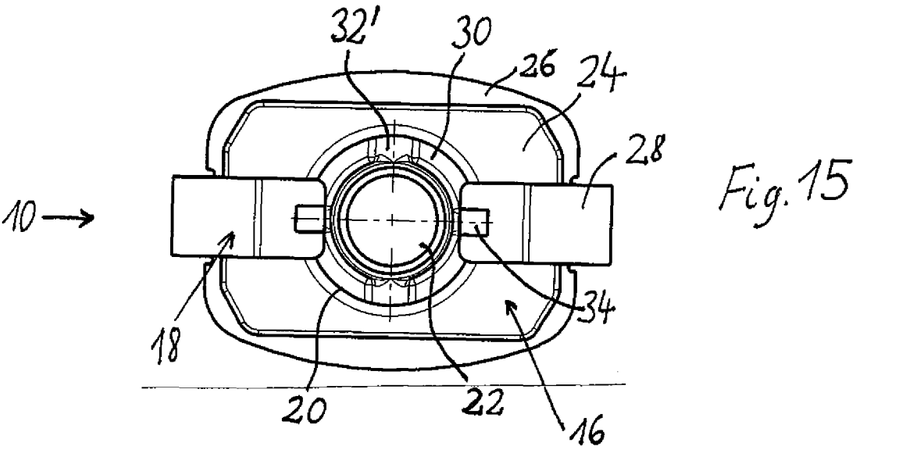
FIG. 15 shows the assembled cage nut of FIG. 13, viewed from above.

FIG. 15 shows the cage nut 10 according to the invention in the assembled state and in the installation position, viewed from above. This figure also clearly shows the configuration and arrangement of the cams 32, 32'.

Figure 16:
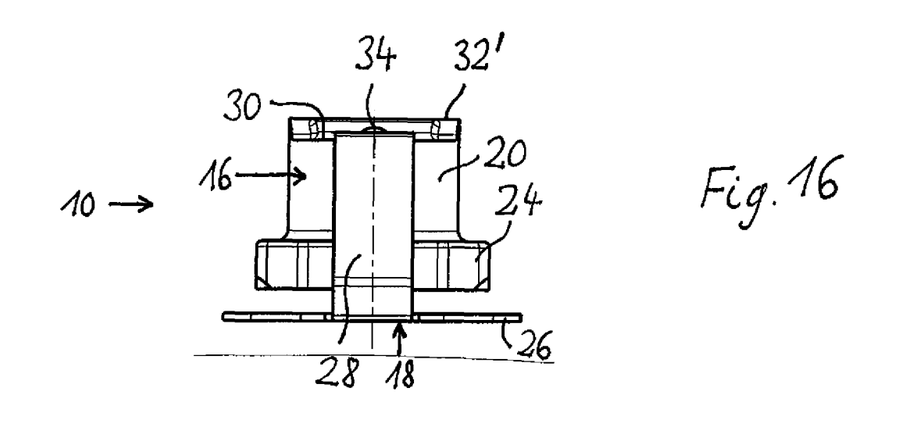
FIG. 16 shows the assembled cage nut of FIG. 13, viewed from the short side.

FIG. 16 shows the assembled cage nut 10 according to the invention, viewed from the short side, also in the installation position.

The present invention provides for the first time a cage nut specifically for unilateral access. Unlike cage nuts of the prior art, the cage nut according to the invention can be directly inserted into a rectangular hole in a metal sheet or in a tubular profile. No auxiliary holes are required for inserting the cage at the side, as is necessary in the case of so-called C-clips of the prior art. According to the invention, for the first time, the cage 18 is itself clipped directly into the hole and is fixed automatically by an undercut in the cage. The nut body 16 rests on two stop elements 38 which develop out of the base plate 26 of the cage 18. The two resilient arms 28 have two functions: firstly, to generate a spring effect/pretension to allow the cage 18 to be clipped into the rectangular hole 12 in the metal sheet 14 and secondly, to hold down/press down the nut body 16 with a spring force, so that the nut body 16 rests on the stop elements 38, even when an appropriate counter force is generated by the inserting/impressing of a bolt for the bolting down procedure.

The internal thread 22 of the nut body 16 is advantageously provided with a thread securing means (clamping means) in the region remote from the metal sheet, up to which securing means the bolt can be screwed in from the lower side without relatively great resistance. As soon as the bolt runs against the clamping means, the nut body 16 rotates relative to the cage 18 and to the metal sheet 14. Since the nut body 16 only sits on the two stop elements 38, configured as sheet metal lugs, of the cage 18, the nut body can be easily rotated. After a rotation by 90°, the two stop elements 38 lock into the rectangular recess 44 under the internal thread 22. As soon as the stop elements 38 lock into the recess 44, the spring force of the resilient arms 28 presses the nut body 16 down onto the sheet 14. At the same time, further rotation of the nut body 16 is stopped, because the stop elements 38 in the recess 44 run against the edge 48 and become locked there or further rotation is blocked by this edge 48. To ensure that even when the nut body 16 sinks, sufficient spring force from the resilient arms 28 of the cage 18 still acts on the nut body 16, said nut body 16 can have in the upper region a type of cam 32' which compensates the height difference during the sinking onto the sheet. After the nut body 16 has been blocked on the stop elements 38, the bolt can then be screwed in against the clamping/securing means until the set tightening moment is reached. Since the abutment part 24 has a contact surface which is great enough such that the maximum surface pressure of the sheet 14, which can be made of aluminium, for example, is not exceeded, the cage nut according to the invention functions as a standard nut-bolt connection, but with the advantage of a simple clip-in installation, also with only unilateral access.

FIGS. 17 to 24 show an embodiment of the cage nut 110 according to the invention which can be produced in a particularly economical manner.

Figure 17:
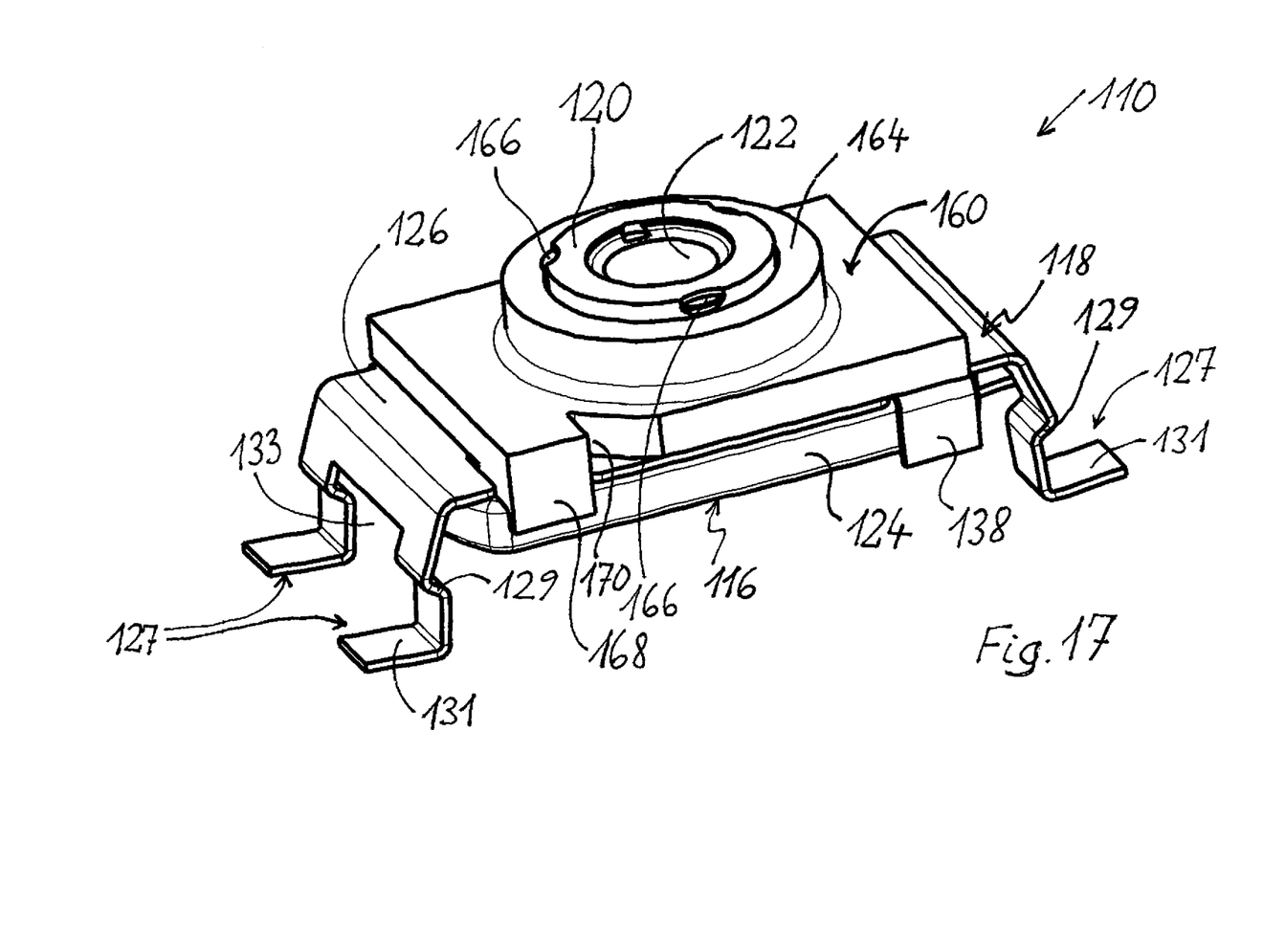
FIG. 17 is a spatial view of a further particularly preferred embodiment of the cage nut according to the invention in the installation position.

FIG. 17 shows this cage nut 110 obliquely from above, in other words, viewed from the blind side. This embodiment of the cage nut also has a nut body 116 which is enclosed by a cage 118. In this case as well, the nut body 116 comprises a cylindrical internal thread carrier 120 with an internal thread 122 and an abutment part 124 which is in the form of an elongate rectangle rounded off at the corners, and which develops out of the workpiece-side end of the internal thread carrier 120. The cage 118 consists of a thin sheet of spring steel and has an elongate rectangular base plate 126, the shape of the base plate 126 approximately corresponding to the shape of the abutment part 124. Adjoining the two narrow sides of the rectangular base plate 126 are curved resilient elements 127 which extend in a direction away from the blind side, have a slight offset 129 and an end stop 131, using which elements 127 the cage 118 can be clipped into a suitable opening of a corresponding size in a workpiece.

Furthermore, attached to the longitudinal sides of the base plate 126 is a respective stop element 138 which also extends away from the blind side. In this respect, the two stop elements 138 are attached diagonally opposite one another and against the diagonal in which the nut body 116 would move when a bolt is screwed into the internal thread 122. In the present case, the embodiment is illustrated for a right-handed thread as the internal thread 122, and the embodiment would be mirror-inverted for a left-handed thread.

The function of the stop elements 138 is to prevent the nut body 116 from being able to rotate in the wrong direction, for example when a bolt is to be unscrewed again, and to serve as stop elements in the screwing-in direction, and thus the nut body 116 abuts against these stop elements 138 at approximately 90° with respect to the installation position when a bolt is screwed in and thus remains in position.

In this embodiment as well, the design engineer faces the problem that the nut body must be held in a "floating" manner above the plane of the workpiece in the installation position. In this embodiment, this is achieved by a plastics material part 160 which is also rectangular and approximately has the dimensions of the abutment part 124 or of the base plate 126 of the cage 118, although it can be shorter in the longitudinal direction. This plastics material part 160 is positioned directly onto the blind-side surface of the base plate 126. To make this possible, it has a passage opening, through which the internal thread carrier 120 passes. To improve the mounting of the plastics material part 160 on the internal thread carrier 120, it is possible for a collar 164, arranged coaxially to the internal thread carrier 120, on the plastics material part 160 to extend in the direction of the blind side, as shown here. The plastics material part 160 can be attached to the internal thread carrier 120 either by an interference fit (provided by the resilience of the plastics material of the plastics material part 160) of the internal thread on the passage opening 162 or additionally on the collar 164.

Shown here is a reinforced attachment by pressing, and it is possible to see the corresponding deformations 166 on the internal thread carrier 120, which rule out the possibility of the plastics material part 160 sliding off the internal thread carrier 120. To be able to hold the nut body 116, the plastics material part 160 is provided with arms 168 which are resilient and completely encompass the base plate 126 and partly encompass the abutment part 124. To improve the elastic deformability of the arms 168, said arms can be partly separated from the plastics material part 160 by means of a wedge-shaped notch 170. Furthermore, a recess 172 for each of the arms 168 can be provided in the base plate 126.

As shown here, the resilient elements 127 on each of the longitudinal sides of the base plate 126 can merely be formed in the vicinity of the corners of the base plate 126 and can be separated by a recess 133, depending on the size of the corresponding cage nut and on the desired spring force for the clipping-in procedure, although a continuous metal sheet can also be used which extends over the entire narrow side without a recess.

Figure 18:
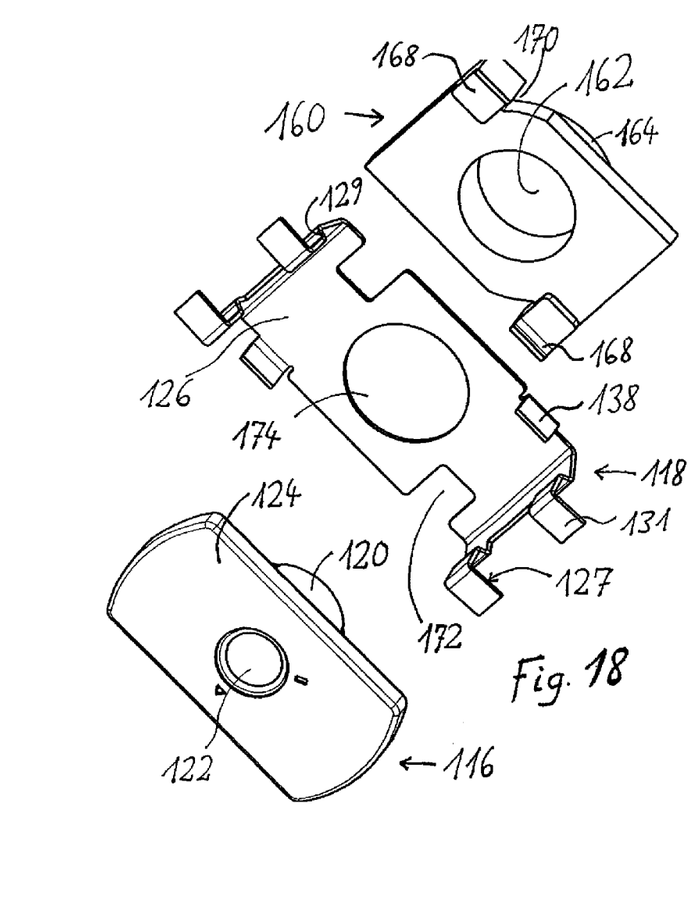
FIG. 18 is a spatial exploded view of the cage nut of FIG. 17 from below.
Figure 19:
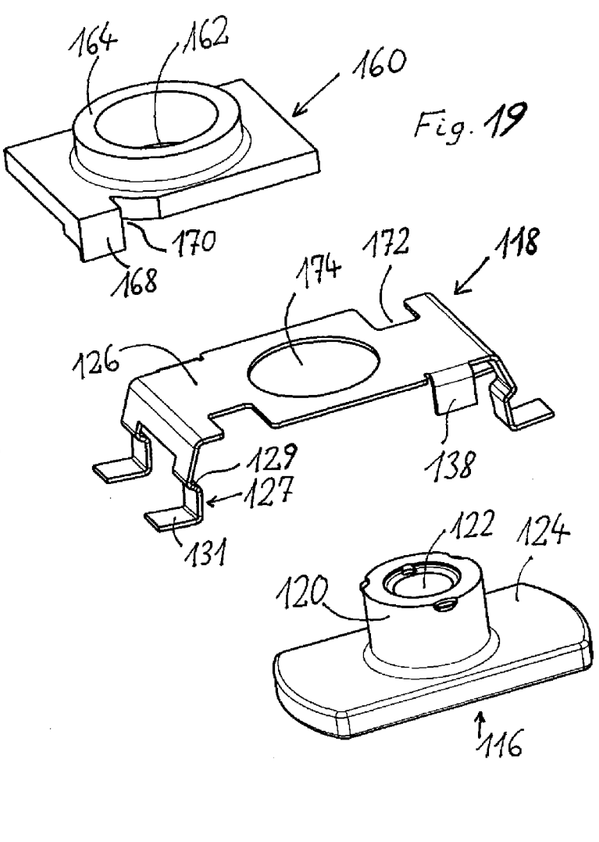
FIG. 19 is a spatial exploded view of the cage nut of FIG. 17 obliquely from above.

The configuration of the individual constituents of plastics material part 160, cage 118 and nut body 116 becomes even clearer in the exploded drawings of FIGS. 18 and 19. FIG. 18 shows the exploded drawing obliquely from below, i.e. viewed from the screwing-in side. Viewed upwards from the bottommost drawing, the nut body 116 with the internal thread 122 and the internal thread carrier 120 can be clearly seen. From the side shown here, after installation, an appropriate bolt can be screwed into the internal thread 122. In the embodiment illustrated here, this figure shows very clearly how not only the edges of the base plate 124 are rounded off but also, to achieve an improved utilisation of space in the cage 118, how the narrow sides of the rectangular abutment part 124 are rounded off in the form of a circular arc. The next illustration upwards is of the cage 118 and in this figure, the recesses 172 for the arms 168 and the passage opening 174 through the base plate 126 of the cage 118 are very clearly visible. In an installed state, the internal thread carrier 120 extends with a corresponding clearance through the circular opening 174.

Shown further up is the plastics material part 160, the opening 162 for receiving the internal thread carrier 120 and the arms 168 with the wedge-shaped recesses 170, arranged next to them, being particularly clearly visible here.

FIG. 19 shows the same exploded view, but here it is obliquely from above, in other words, viewed obliquely from the blind side. This figure also shows upwards from below: nut body 116, cage 118 and plastics material part 160. The opening 174 in the base plate 126 of the cage 118 for the passage of the internal thread carrier 120 and also the recess 172 for the arms 168 of the plastics material part 160 can also be seen particularly clearly here. In the illustration of the plastics material part 160, only one of the arms 168 with the wedge-shaped recess 170 and the collar 164 can be seen. The rounding, in the shape of a circular arc, of the narrow sides of the abutment part 124 of the nut body 116 can also be clearly seen here.

Figure 20:
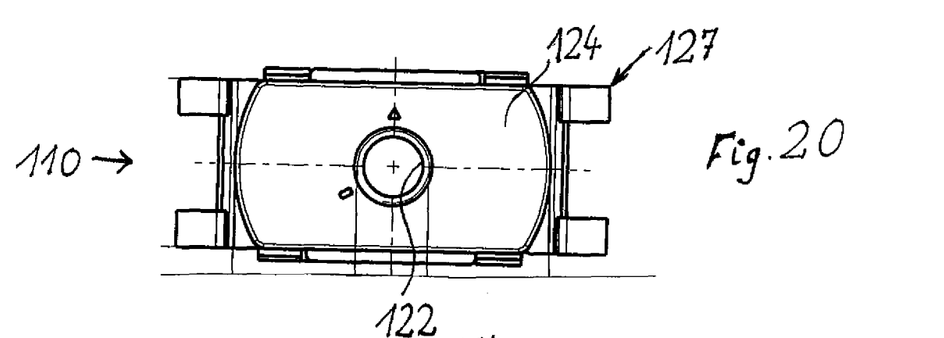
FIG. 20 shows the cage nut of FIG. 17 in the installation position from below.

FIG. 20 shows the preferred embodiment of the cage nut 110, viewed from the screwing-in side. This figure also clearly shows the rounding, in the shape of a circular arc, of the narrow sides of the abutment part 124 of the nut body 116.

Figure 21:
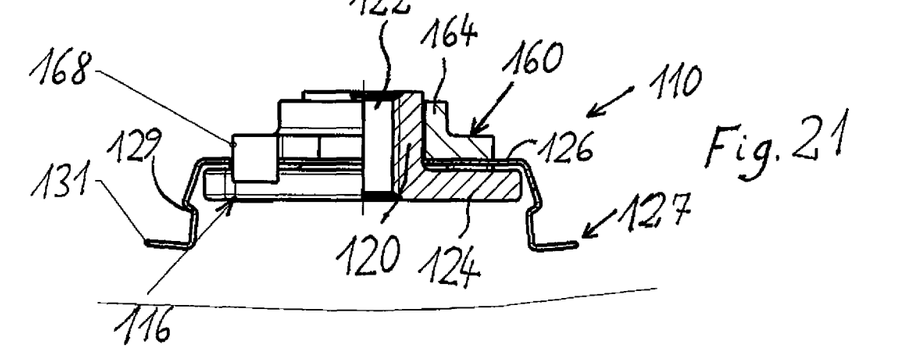
FIG. 21 shows the cage nut of FIG. 17 in the installation position from the side, cut partially along the axis of rotation of the internal thread.

FIG. 21 shows the further embodiment of the cage nut 110 according to the invention from the side and partially cut along the axis of rotation of the internal thread 122. This figure shows particularly clearly how the base plate 126 of the cage 118 is received between the plastics material part 160 and the abutment part 124 of the nut body 116, while the collar 164 of the plastics material part 160 forms an interference fit with the internal thread carrier 120.

Figure 22:
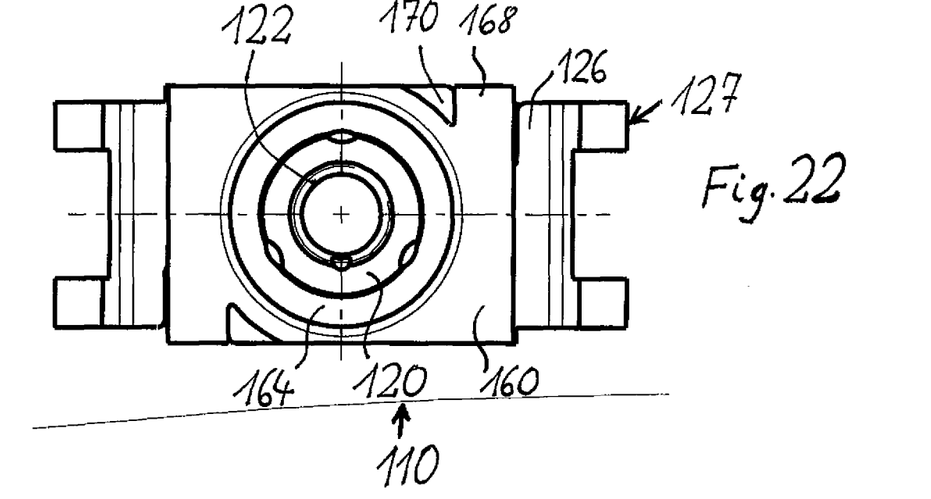
FIG. 22 shows the cage nut of FIG. 17 in the installation position from above.

FIG. 22 shows the further embodiment of the cage nut 110 according to the invention from the blind side. This figure shows particularly clearly the arms 168 and the recesses thereof 170.

Figure 23:
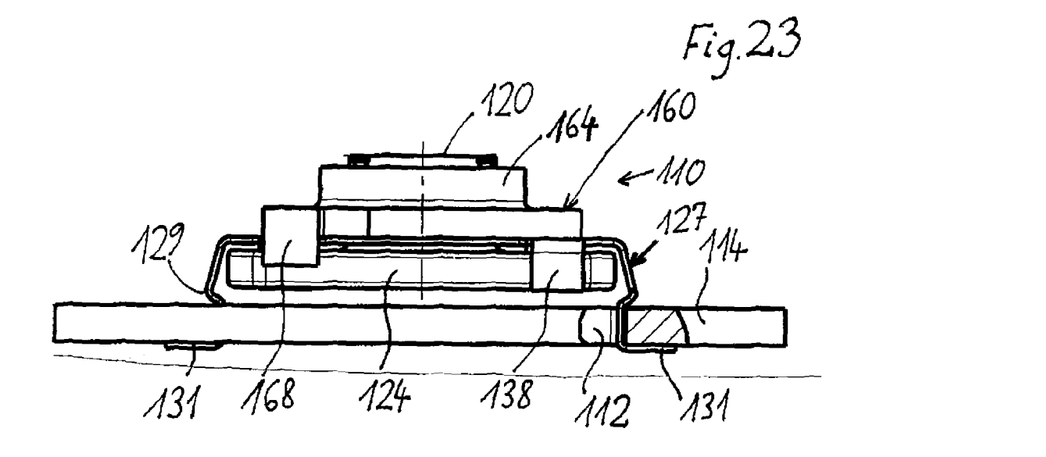
FIG. 23 shows the cage nut of FIG. 17 from the side, fitted into a suitable opening.

Finally, FIG. 23 shows how the further embodiment of the cage nut 110 is inserted into a corresponding opening 112 in a workpiece 114. This figure shows particularly clearly how the stop ends 131 of the clips 127 come into contact with the workpiece, while the undercut 129 of the clips 127 hold the cage nut 110 in a defined position. The figure also clearly shows here how the abutment part 124 is held by the arms 168 and the stops 138 such that it floats above the plane of the workpiece 114.

Figure 24:
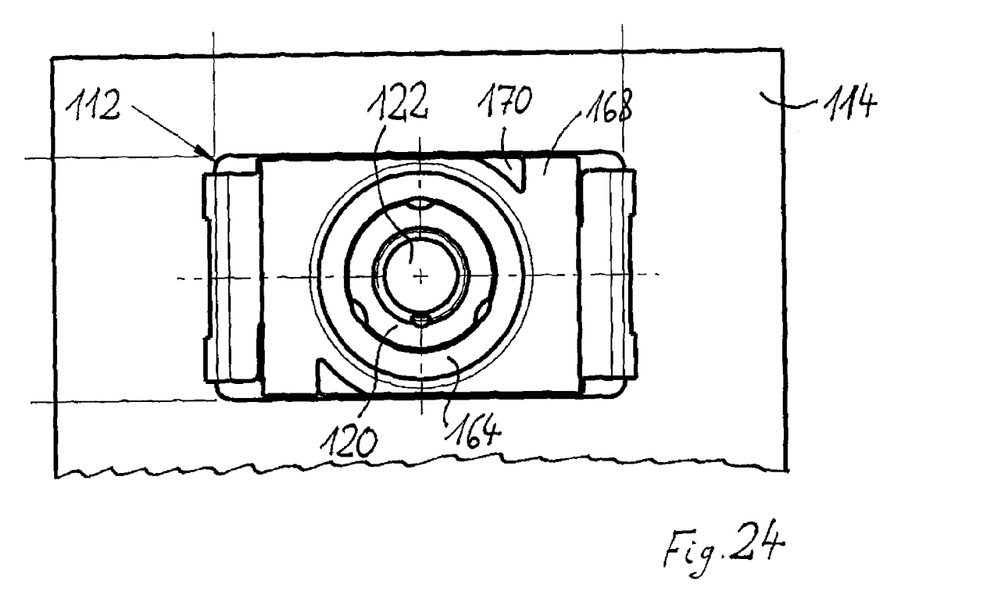
FIG. 24 shows the cage nut of FIG. 17 fitted into a suitable opening, in the installed position, viewed from the blind side.

FIG. 24 shows the illustration of FIG. 23 from the blind side. This figure particularly clearly shows the opening 112, to be provided for the installation of the cage nut 110, in the workpiece 114.

Starting from the installed state shown in FIGS. 23 and 24, the following takes place when a bolt is screwed into the internal thread 122:

As a result of the bolting procedure, on the one hand the nut body 116 is drawn onto the plane of the workpiece 114 and on the other, is subjected to a torque. As a result, the arms 168 draw aside, the nut body rotates by 90° in the screwing-in direction until it contacts with its longitudinal side the narrow edge of the stop elements 138. The nut body 116 is then located in the retaining position in which it rests with a large part of its base area on the workpiece 114 outside the opening 112, and thus forms a reliable abutment for the bolting procedure, with which abutment an excessively high load by the workpiece 114 is avoided, since an adequate surface is available to divert the forces.

A release of the bolting is again easily possible, because then, as soon as the bolting forces cease, the nut body is rotated back into the installation position until it comes into contact again with the broadsides of the stop elements 138, as a result of which the cage nut is again located in the installation position. The arms 168 can snap in again and the nut could even be removed from the opening again by compressing the clip 127.

Therefore, the present invention affords the following advantages:

The cage nut 10;110 according to the invention can be clipped directly into a punched, rectangular hole. No tools or aids are required for this installation and the cage nut can also be easily installed using only one hand. Unlike a "C-clip" nut when introduced through the auxiliary hole, the cage nut according to the invention cannot fall on the blind side and thus "disappear".

The cage nut 10;110 according to the invention can be used for different sheet metal thicknesses by an appropriate configuration of the cage 18;118. Furthermore, there is a smooth contact surface for the component to be installed, and not a curved surface, as in the case of the "C-clip" nut. This produces a reduced sinking of the connection.

The cage nut 10;110 according to the invention is advantageously bolted automatically by the insertion and screwing in of the bolt.

Finally, in the present invention, the contact surface of the abutment part 24;124 can be configured to be large enough so that sheets of light metal (for example aluminium) also withstand the surface pressure when a bolt is installed beyond the elastic limit.

What is claimed is:

1. A cage nut for installation in an elongate, rectangular opening which is only accessible from one side, comprising a nut body with a cylindrical internal thread carrier having an internal thread and an abutment part attached thereto, and a cage encompassing the nut body, characterized in that the abutment part is adapted to the shape of the opening and has a slightly smaller width and a slightly shorter length than the opening, although the length of the abutment part is significantly greater than the width of the opening; in that the cage is configured resiliently and is adapted to the shape of the opening such that it can be clipped into the opening and in that the cage supports stop elements which only allow a rotation of the abutment part with respect to the cage in the screwing-in direction of the internal thread from an installation position parallel to the longitudinal direction of the cage into a retaining position approximately perpendicular thereto, wherein attached on a blind side of the cage, on the cylindrical internal thread carrier is a plastics material part which has a central opening and has resilient arms which extend beyond a blind-side surface of the cage level with the abutment part and hold said abutment part in a floating manner in the installation position.

2. The cage nut according to claim 1, wherein the plastics material part is provided with a collar which extends in the direction of the blind side and concentrically encloses the cylindrical internal thread carrier.

3. The cage nut according to claim 1, wherein the dimensions of the blind-side surface of the cage and of the plastics material part are similar to the dimensions of the abutment part, and the arms are each arranged diagonally in the vicinity of corners of the plastics material part, in the screwing-in direction of the internal thread, while the stop elements are arranged in each case opposite the arms.

* * * * *